(12) United States Patent
Yamakaji et al.

(10) Patent No.: US 9,664,383 B2
(45) Date of Patent: May 30, 2017

(54) DENITRIFICATION APPARATUS (71) Applicant: BABCOCK-HITACHI KABUSHIKI KAISHA, Kanagawa (JP)

(72) Inventors: Hiroshi Yamakaji, Hiroshima (JP); Ryosuke Nakagawa, Kanagawa (JP); Satoru Shishido, Hiroshima (JP); Toru Ogasahara, Hiroshima (JP)

(73) Assignee: BABOCK-HITACHI KABUSHIKI KAISHA, Kanagawa (JP)

( * ) Notice: Subject to any disclaimer, the term of this patent is extended or adjusted under 35 U.S.C. 154(b) by 577 days.

(21) Appl. No.: 14/289,697

(22) Filed: May 29, 2014

(65) Prior Publication Data

US 2014/0356236 A1 Dec. 4, 2014

(30) Foreign Application Priority Data

May 31, 2013 (JP) .................. 2013-116352

(51) Int. Cl.
```
F01N 3/20      (2006.01)
B01D 53/86     (2006.01)
F23J 15/00     (2006.01)
B01D 53/90     (2006.01)
B01D 53/94     (2006.01)
F23J 15/04     (2006.01)
```

(52) U.S. Cl.
CPC ............ F23J 15/003 (2013.01); B01D 53/90 (2013.01); B01D 53/9431 (2013.01); F23J 15/04 (2013.01); B01D 2251/2062 (2013.01); B01D 2259/124 (2013.01); F23J 2215/10 (2013.01); F23J 2219/10 (2013.01)

(58) Field of Classification Search
None
See application file for complete search history.

(56) References Cited

U.S. PATENT DOCUMENTS

2012/0299205 A1* 11/2012 Lee .................... B01D 53/9409
261/27

FOREIGN PATENT DOCUMENTS

WO 01/12299 A1 2/2001

* cited by examiner

Primary Examiner — Walter D Griffin
Assistant Examiner — Jelitza Perez
(74) Attorney, Agent, or Firm — Heslin Rothenberg Farley & Mesiti, P.C.

(57) ABSTRACT

There is provided a denitrification apparatus capable of reducing NOx from a combustion facility and preventing evaporation of a reducing liquid in a lance and an injection nozzle in the combustion facility in operation at a low load by adjusting concentration of a reducing agent, thereby achieving complete evaporation of the reducing liquid in an exhaust gas duct. The denitrification apparatus of the present invention includes: a nozzle for spraying a reducing liquid containing a reducing agent for reducing nitrogen oxides in exhaust gas discharged from a combustion facility into the exhaust gas by using a flow of gas; a gas supply unit for supplying the gas to the nozzle; a reducing liquid supply unit for supplying the reducing liquid to the nozzle; and a concentration control unit for adjusting concentration of the reducing agent on the basis of a temperature of the exhaust gas and a supply amount of the reducing liquid by supplying a diluting liquid to the reducing liquid so that the reducing agent is not vaporized in the reducing liquid supply unit.

15 Claims, 10 Drawing Sheets

DENITRIFICATION APPARATUS

BACKGROUND OF THE INVENTION

Field of the Invention

The present invention relates to a denitrification apparatus, and more particularly, to a denitrification apparatus that reduces nitrogen oxides included in exhaust gas discharged from combustion facilities.

Description of the Related Art

Nitrogen oxides (NOx) in exhaust gas discharged from thermal power plants and various plants serve as a causative agent of photochemical smog and acid rain, therefore, a fuel gas denitrification method by selective catalytic reduction using ammonia ($NH_3$) as a reducing agent is widely used as a removal technique of the nitrogen oxides. The selective catalytic reduction is performed by injecting $NH_3$ to NOx included in exhaust gas as shown in an expression (1) below to reduce NOx by using a denitrification catalyst.

$$4NO+4NH_3+O_2 \rightarrow 4N_2+6H_2O \qquad (1)$$

In recent years, in the United Stated, a case of transporting ammonia in the form of ammonia water becomes usual in order to safely transport ammonia serving as a reducing agent. In a case where ammonia water is used as a reducing agent, usually the ammonia water is sprayed into an exhaust gas duct after temporarily vaporized by using a heat source such as a heater to allow a reaction according to the expression (1) to occur. In that case, however, considerable energy is required to vaporize the ammonia water by using a heat source. On the other hand, in recent years, apparatuses have begun to be installed which are provided with a system of vaporizing ammonia water by atomizing the ammonia water to be directly sprayed into an exhaust gas duct so that the ammonia water is directly vaporized because of the high temperature heat of exhaust gas (refer to Patent Literature 1: International Publication No. WO 01/012299, for example). In the system, since it is required to spray ammonia water into an exhaust gas duct by atomizing the ammonia water, an injection nozzle including a two-fluid nozzle for spraying the ammonia water and compressed air for spraying the ammonia water is generally used.

In addition, in equipment in a thermal power plant, exhaust gas from a coal-fired boiler contains many ashes, so that deposits of the ashes are produced in a bottom of an exhaust gas duct installed in a horizontal portion.

In a case where ammonia water is sprayed into an exhaust gas duct after temporarily vaporized by using a heat source such as a heater, considerable energy is required to vaporize the ammonia water by using the heat source, resulting in low energy efficiency.

In addition, like the invention described in Patent Literature 1, in a case where ammonia water is atomized to be directly sprayed into an exhaust gas duct so that the ammonia water is directly vaporized because of the high temperature heat of exhaust gas, a heat source for vaporizing the ammonia water and a dilution fan for diluting vaporized ammonia become unnecessary. As a result, initial apparatus cost for such a facility and operating cost are reduced. However, since concentration of NOx contained in exhaust gas is reduced due to low NOx combustion and the like in recent years, an amount of ammonia water required by the denitrification apparatus is reduced. As above, if a supply amount of ammonia water to be supplied into an exhaust gas duct is reduced, ammonia water stayed in a lance and an injection nozzle, which spray the ammonia water into the exhaust gas duct, tends to evaporate. Bubbles produced by the evaporation of the ammonia water cause unstable amounts of ammonia water sprayed from the injection nozzle to obstruct steady atomizing and spraying, thereby reducing denitrification performance.

Figure 16:
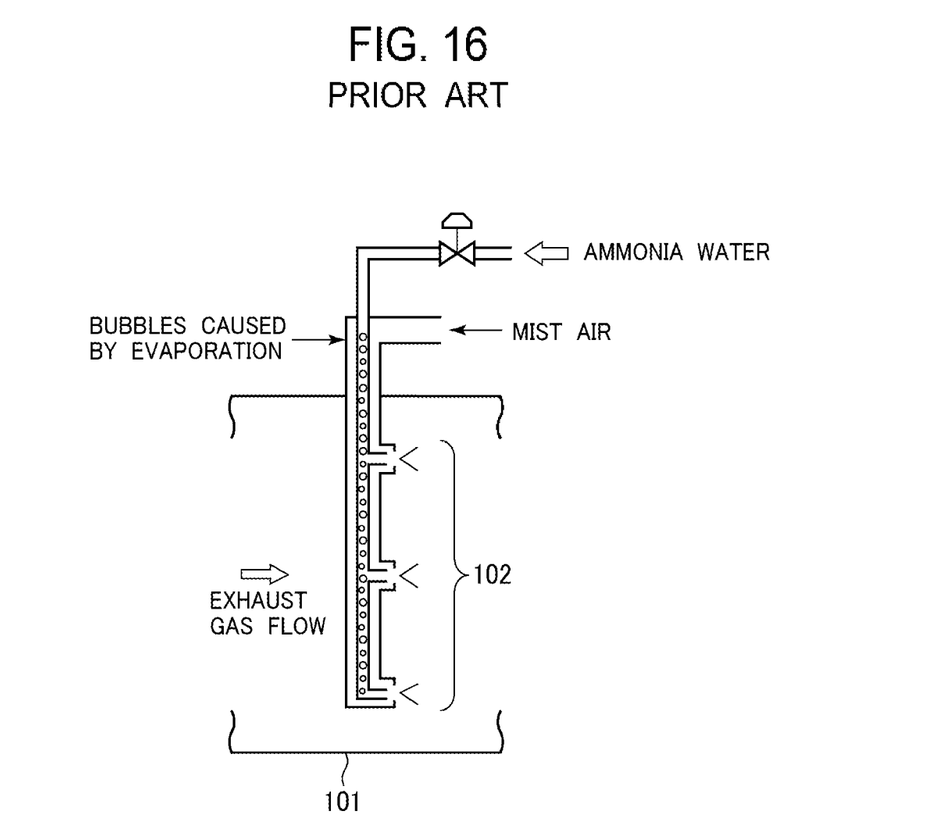
FIG. 16 shows an example of a conventional denitrification apparatus.

As shown in FIG. 16, for example, there is a case where concentration of NOx contained in exhaust gas in an exhaust gas duct 101 is low due to low NOx combustion and the like, or a case where ammonia water is required to be injected into an exhaust gas duct 101 even at the time of operating at a low load, due to tightening of NOx emission regulation. In the cases above, the ammonia water is heated by temperature of exhaust gas and the like before the ammonia water reaches a spray nozzle 102 with reduction in ammonia water used in denitrification reaction, which causes a part of the ammonia water to evaporate, whereby bubbles occur. As a result, an amount of the ammonia supplied to the spray nozzle 102 becomes intermittent and unstable, thereby reducing denitrification performance.

An object of the present invention, in light of the above-mentioned problem, is to provide a denitrification apparatus capable of supplying an amount of a reducing liquid corresponding to concentration of nitrogen oxides in exhaust gas to a nozzle provided in an exhaust gas duct regardless of a load of a combustion facility, and preventing denitrification performance thereof from deteriorating by preventing vaporization of the reducing liquid in a reducing liquid supply unit for supplying the reducing liquid to the nozzle.

SUMMARY OF THE INVENTION

A denitrification apparatus of the present invention includes: a nozzle for spraying a reducing liquid containing a reducing agent for reducing nitrogen oxides in exhaust gas discharged from a combustion facility into the exhaust gas by using a flow of gas; a gas supply unit for supplying the gas to the nozzle; a reducing liquid supply unit for supplying the reducing liquid to the nozzle; and a concentration control unit for adjusting concentration of the reducing agent on the basis of a temperature of the exhaust gas and a supply amount of the reducing liquid by supplying a diluting liquid to the reducing liquid so that the reducing agent is not vaporized in the reducing liquid supply unit. As a result, according to the denitrification apparatus of the present invention, it is possible to steady a spray amount of the reducing liquid by adjusting concentration of a reducing agent in response to reduction in NOx from a combustion facility and an operation at a low load in the combustion facility in order to prevent a reducing liquid from vaporizing in the reducing liquid supply unit connected to the nozzle, whereby it is possible to prevent denitrification performance from deteriorating.

In accordance with the present invention, it is possible to supply a reducing liquid at a flow rate corresponding to a concentration of nitrogen oxides in exhaust gas to a nozzle provided in an exhaust gas duct, and to prevent denitrification performance from deteriorating by preventing the reducing liquid from vaporizing in a reducing liquid supply unit for supplying the reducing liquid to the nozzle.

DETAILED DESCRIPTION OF THE PREFERRED EMBODIMENTS

Figure 1:
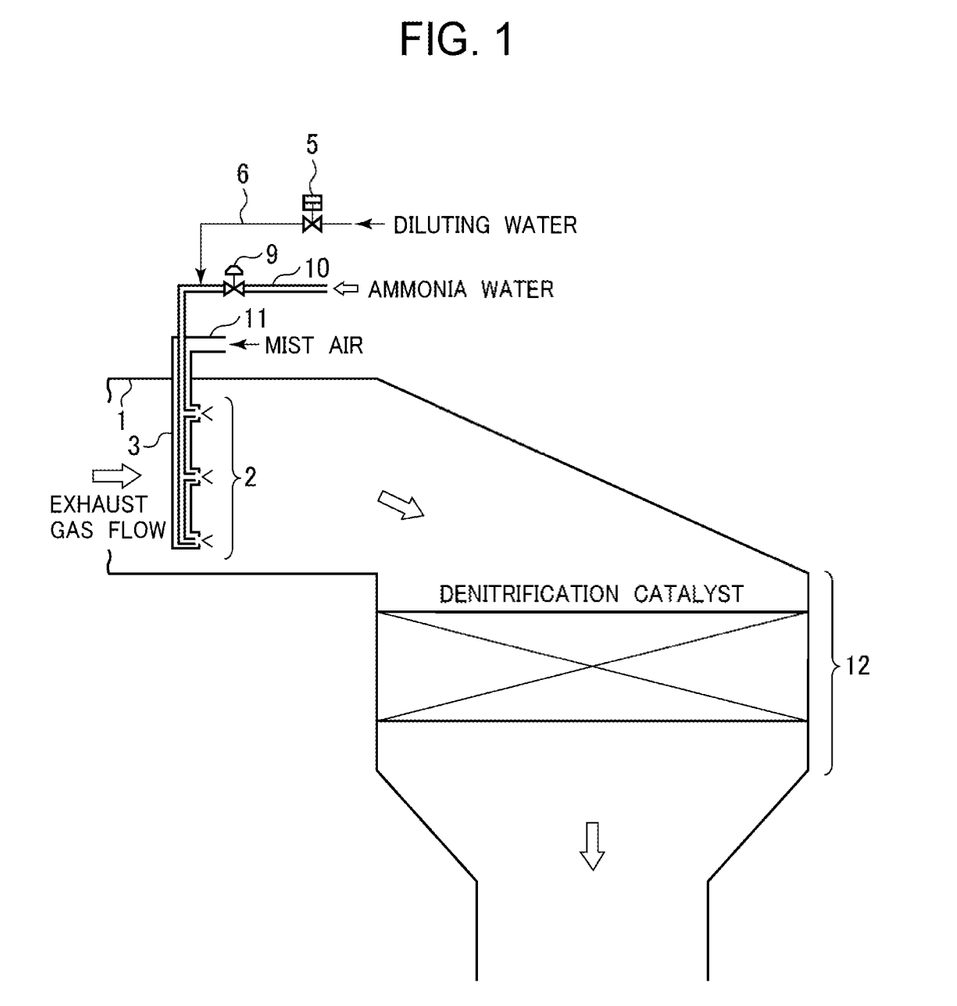
FIG. 1 shows an example of a first embodiment of a denitrification apparatus.

Hereinafter, embodiments of a denitrification apparatus of the present invention will be described with reference to drawings. FIG. 1 is a drawing showing an example of the denitrification apparatus of an embodiment 1. FIG. 1 shows arrangement of the denitrification apparatus including a nozzle 2 for spaying a reducing liquid (ammonia water or urea water, for example) and a denitrification catalyst 12 in an exhaust gas duct 1, and a reducing liquid supply system installed upstream the nozzle 2.

The denitrification apparatus in accordance with the embodiment includes: a nozzle 2 for spraying a reducing liquid including a reducing agent for reducing nitrogen oxides (NOx) in exhaust gas discharged from a combustion facility into the exhaust gas by using a flow of gas; a gas supply unit (an air supply line 11 and a lance 3) for supplying the gas (mist air) to the nozzle 2; a reducing liquid supply unit (an ammonia water supply line 10 and the lance 3) for supplying the reducing liquid to the nozzle 2; and a concentration control unit (injection water pipe 6 and an injection water shut/off valve 5) for adjusting concentration of the reducing agent by supplying a diluting liquid to the reducing liquid to prevent the reducing agent from vaporizing in the reducing liquid supply unit (the ammonia water supply line 10 and the lance 3) on the basis of a temperature of the exhaust gas and a supply amount of the reducing liquid. In the present embodiment, ammonia water is used as the reducing liquid, and water (diluting water) is used as the diluting liquid.

Figure 2:
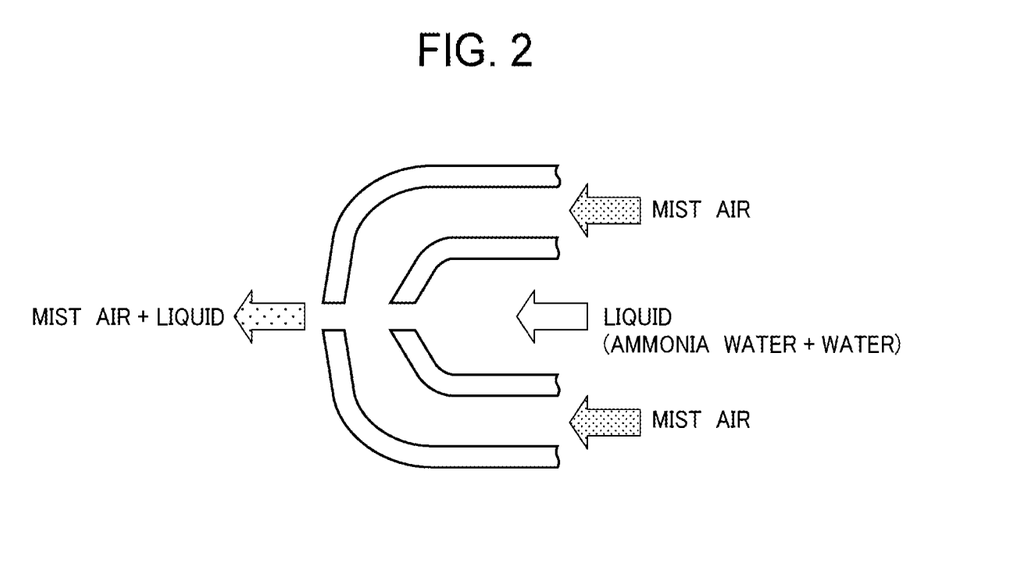
FIG. 2 shows an example of a two-fluid nozzle.

Exhaust gas from which NOx is removed is guided into the denitrification catalyst 12 through the exhaust gas duct 1. As shown in FIG. 2, the nozzle 2 serves as a two-fluid nozzle. The nozzle (ammonia water spray nozzle) 2 injects liquids (ammonia water and water) supplied from the ammonia water supply line 10 and the lance 3 into the exhaust gas in the exhaust gas duct 1 by using mist air supplied from the air supply line 11 and the lance 3. An ammonia water control valve 9 adjusts a flow rate (supply amount) of the ammonia water to be supplied to the nozzle 2 through the ammonia water supply line 10. The injection water pipe 6 and the injection water shut/off valve 5 are provided downstream the ammonia water control valve 9 to supply water (diluting water) to the ammonia water adjusted at a flow rate (supply amount) required for denitrification reaction of NOx in the exhaust gas.

Figure 3:
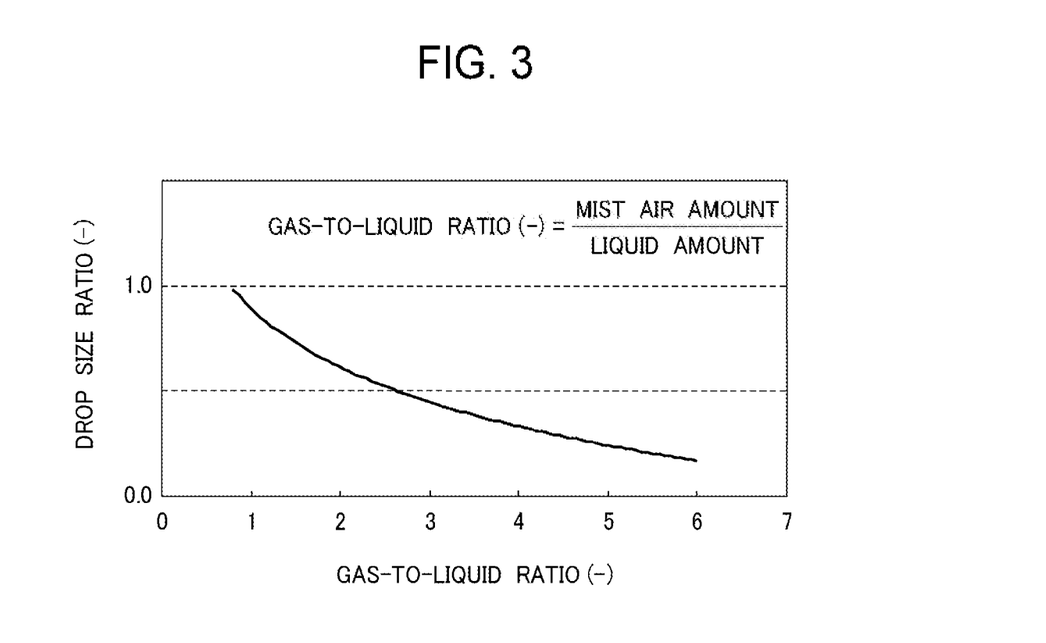
FIG. 3 shows a relationship between a gas-to-liquid ratio and a drop size.
Figure 4:
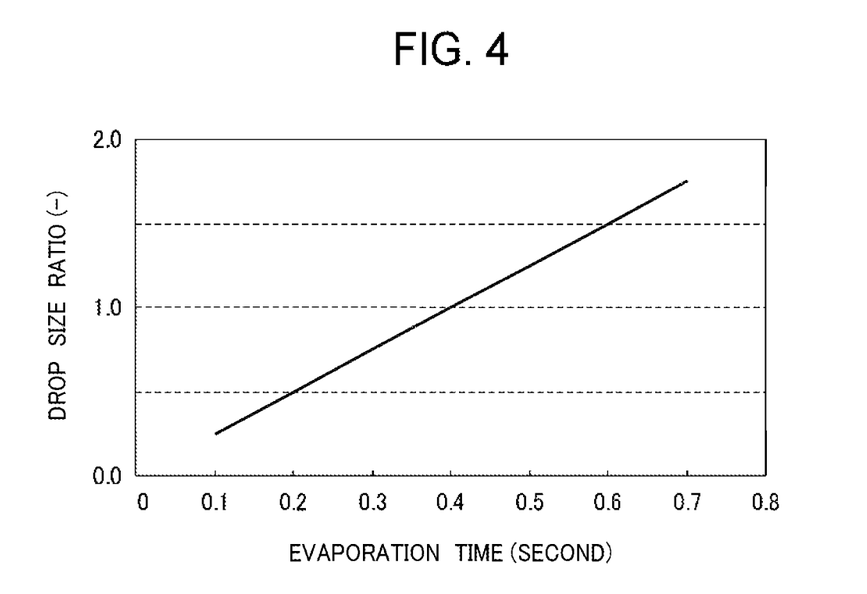
FIG. 4 shows a relationship between a drop size and an evaporation time of a reducing liquid (ammonia water)

A drop size of the reducing liquid (ammonia water) sprayed from the nozzle 2 serving as a two-fluid nozzle is related to a gas-to-liquid ratio (a mist air amount/a liquid amount). As shown in FIG. 3, as the gas-to-liquid ratio increases, the drop size decreases to reduce evaporation time of the reducing liquid (ammonia water) sprayed from the nozzle 2, that is, as shown in FIG. 4, as the drop size decreases, the evaporation time of the reducing liquid (ammonia water) decreases to allow the reducing liquid to evaporate earlier in the exhaust gas duct 1.

A boiler (combustion facility) load is related to temperature of the exhaust gas and a supply amount of the reducing liquid (ammonia water). As characteristics of the boiler load varying operation shown in FIG. 5, as the boiler load decreases, temperature of the exhaust gas decreases. In addition, the boiler load decreases, a discharge amount of the exhaust gas decreases to reduce a flow rate (supply amount) of the reducing liquid (ammonia water) required for denitrification reaction of NOx in the exhaust gas, that is, as shown in FIG. 6, as the boiler load increases, the flow rate (supply amount) of the reducing liquid (ammonia water) sprayed from the nozzle 2 increases.

Figure 7:
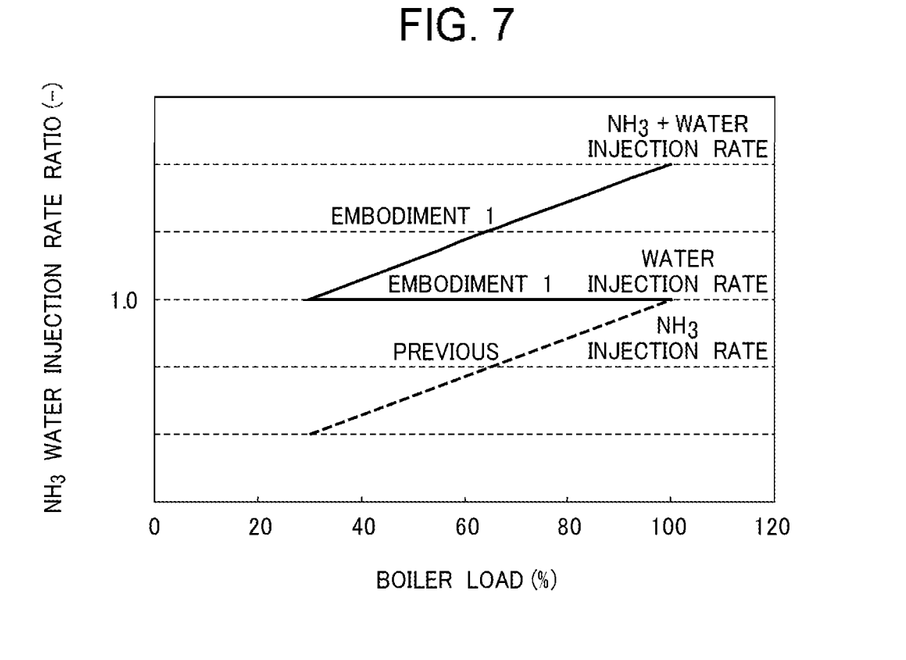
FIG. 7 shows relationships between a boiler load and flow rates (supply amounts) of a diluting liquid (diluting water) and a reducing liquid (ammonia water) in an embodiment 1.

In the embodiment 1, the injection water shut/off valve 5 allows a supply amount of the water (diluting water) to be substantially constant regardless of the boiler (combustion facility) load. In the present embodiment, an amount of water (diluting water) about equal (in terms of weight) to a supply amount of the reducing liquid (ammonia water) in a rated load operation (load 100%) of the boiler is supplied regardless of the boiler (combustion facility) load, that is, as shown in FIG. 7, a supply amount of the water (diluting water) supplied from the injection water pipe 6 is substantially constant regardless of the boiler (combustion facility) load. In addition, as the boiler load increases, the flow rate (supply amount) of the reducing liquid (ammonia water) sprayed from the nozzle 2 increases. Thus, an injection rate of a reducing liquid (ammonia water+water) sprayed from the nozzle 2 in the present embodiment increases as compared to previous approaches by an amount of the supplied water (diluting water), so that the injection rate increases as the boiler load increases.

Figure 8:
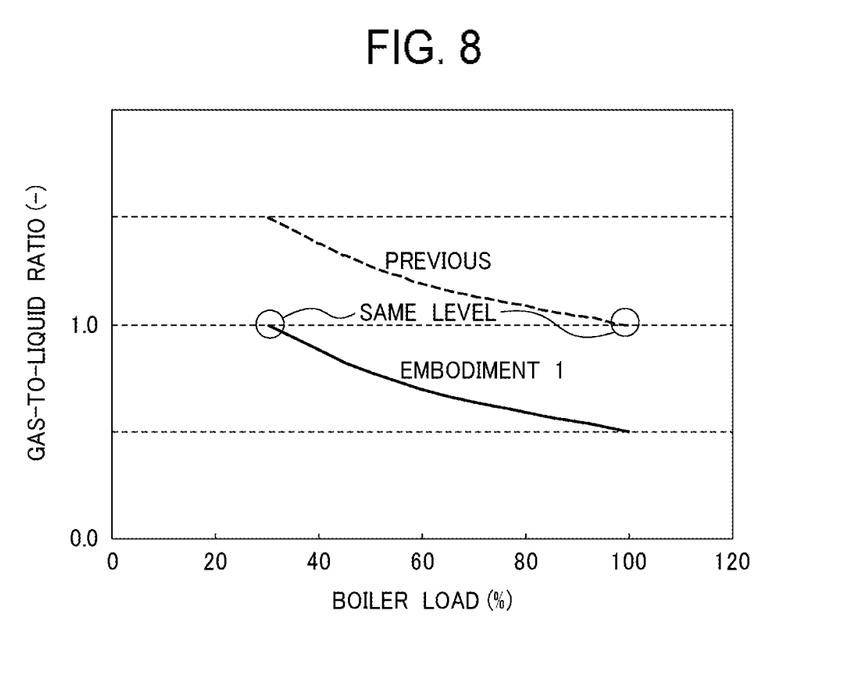
FIG. 8 shows a relationship between a boiler load and a gas-to-liquid ratio in the embodiment 1.

In the present embodiment, an amount of mist air supplied from the air supply line 11 to the nozzle 2 is set to be substantially constant. Thus, as shown in FIG. 8, a gas-to-liquid ratio in the nozzle 2 of the present embodiment decreases as compared to previous approaches by the amount of the supplied water (diluting water), so that the gas-to-liquid ratio decreases as the boiler load increases. In the present embodiment, the water (diluting water) is supplied so that a gas-to-liquid ratio of the present embodiment in the boiler in operation at a low load (load 30%, for example) is set to be similar to a conventional gas-to-liquid ratio in the boiler in operation at rated load (load 100%).

Figure 9:
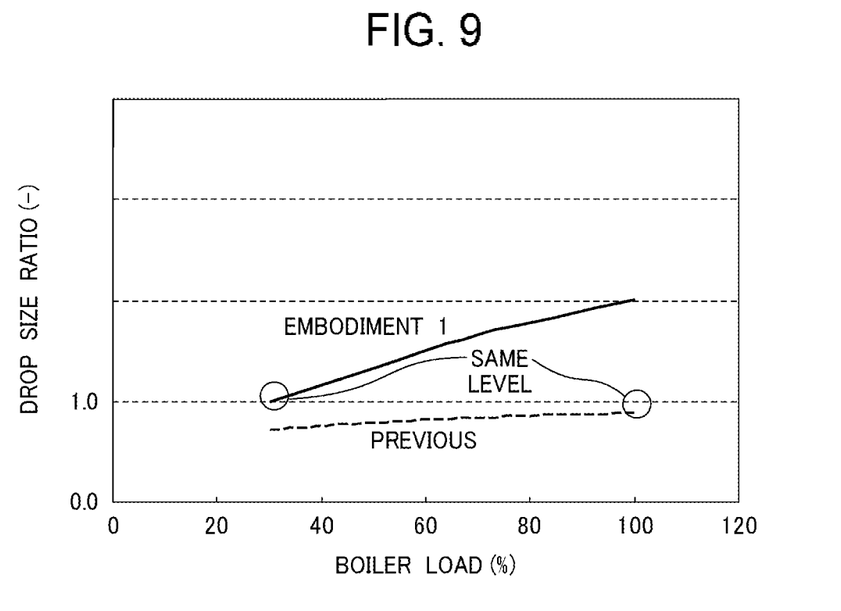
FIG. 9 shows a relationship between a boiler load and a drop size in the embodiment 1.

As above, the concentration control unit (the injection water pipe 6 and the injection water shut/off valve 5) adjusts concentration of ammonia on the basis of the boiler load (temperature of exhaust gas) and a supply amount of ammonia water by supplying water (diluting water) to the ammonia water so that the ammonia is not vaporized in the reducing liquid supply unit (the ammonia water supply line 10 and the lance 3). The denitrification apparatus of the present embodiment adjusts concentration of ammonia by supplying water (diluting water) of an amount that is substantially the same as a supply amount of the ammonia water in a case where the boiler load is 100%. In this case, a gas-to-liquid ratio in the present embodiment decreases as compared to previous approaches by an amount of the supplied water (diluting water), so that a drop size of the present embodiment increases as compared to previous approaches as shown in FIG. 9. However, a drop size of the present embodiment in the boiler in operation at a low load (load 30%, for example) becomes similar to a conventional drop size in the boiler in operation at rated load (load 100%).

Figure 10:
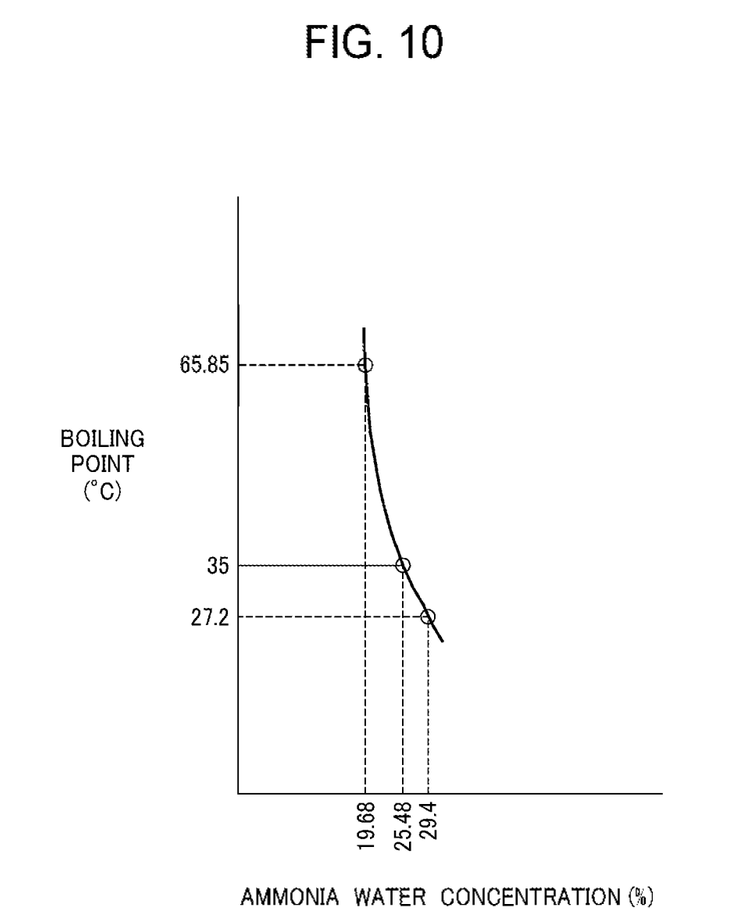
FIG. 10 shows a relationship between a concentration of ammonia water and a boiling point thereof.

The concentration control unit (the injection water pipe 6 and the injection water shut/off valve 5) adjusts a gas-to-liquid ratio of gas and ammonia water on the basis of temperature of exhaust gas by supplying water (diluting water) to the ammonia water so that a drop size of the ammonia water sprayed from the nozzle 2 becomes a predetermined size. If an amount of water (diluting water) about equal (in terms of weight) to a supply amount of the reducing liquid (ammonia water) required for the boiler in operation at rated load (load 100%) is injected to the ammonia water, it is possible to prevent incomplete evaporation of the ammonia water caused by decrease in temperature of exhaust gas in the boiler in operation at a low load. As a result, it is possible to prevent dust adsorbing moisture from plugging the exhaust gas duct 1 or a device provided downstream the exhaust gas duct 1. In addition, the injected water (diluting water) dilutes the ammonia water to allow a boiling point of the ammonia water to rise as shown in FIG. 10 to increase sensible heat by evaporation. As a result, it is possible to prevent the ammonia water from vaporizing in the reducing liquid supply unit (the ammonia water supply line 10 and the lance 3) due to temperature of the exhaust gas, whereby it is possible to perform steady atomizing and spraying by steadying an amount of the ammonia water sprayed from the nozzle 2 to allow denitrification performance in the denitrification apparatus to be maintained.

Figure 11:
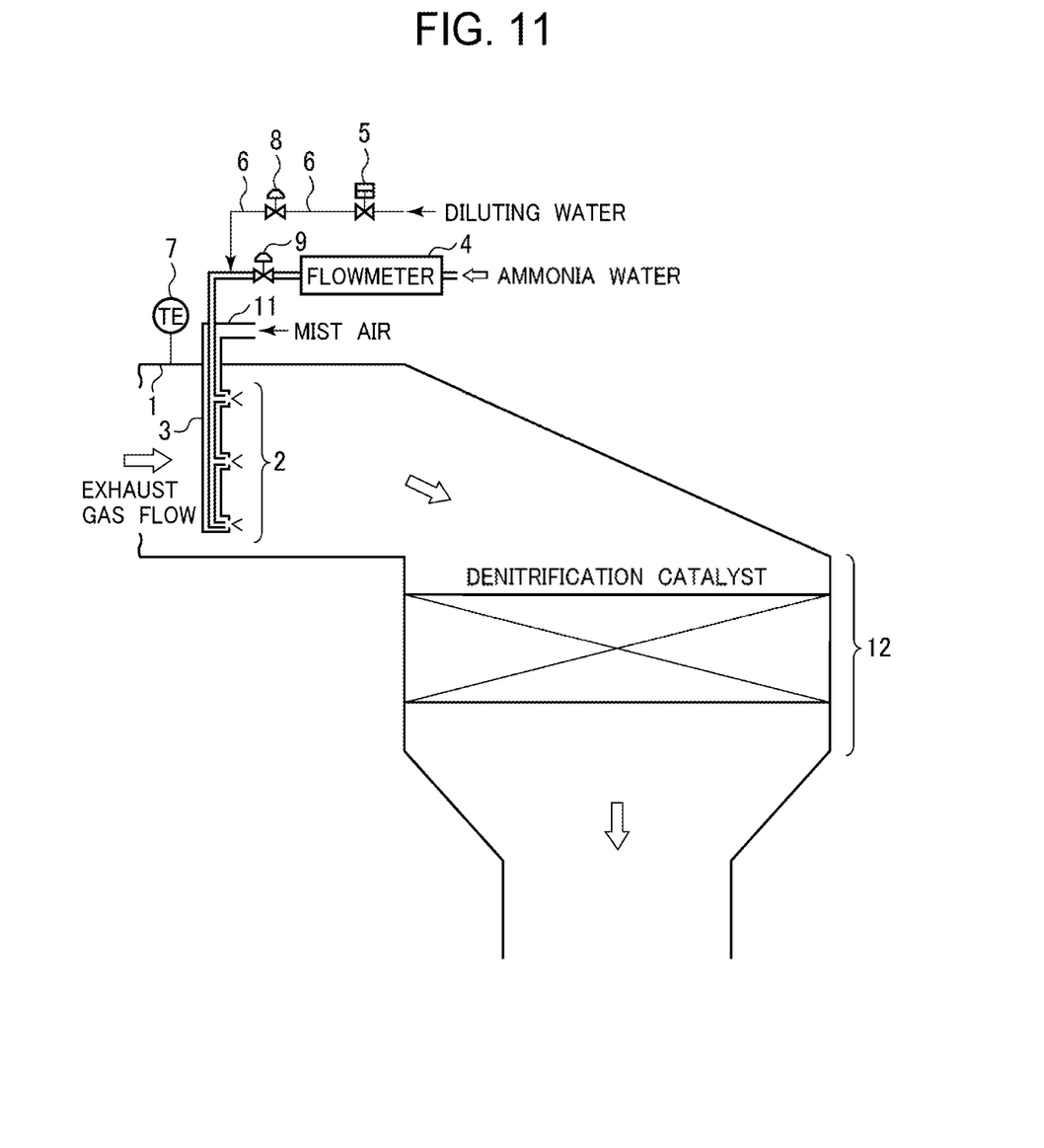
FIG. 11 shows an example of a denitrification apparatus of an embodiment 2.

FIG. 11 shows an example of a denitrification apparatus of the embodiment 2. Unlike the embodiment 1, the denitrification apparatus in accordance with the present embodiment includes an exhaust gas thermometer 7, and an ammonia flowmeter 4. The exhaust gas thermometer 7 measures temperature of exhaust gas corresponding to the boiler load. The ammonia flowmeter 4 measures a flow rate (supply amount) of ammonia water supplied to the nozzle 2 through the ammonia water supply line 10.

In the embodiment 1, the concentration control unit (the injection water pipe 6 and the injection water shut/off valve 5) allows a supply amount of water (diluting water) to be substantially constant regardless of the boiler (combustion facility) load, however, in the embodiment 2, a concentration control unit (the injection water pipe 6, injection water shut/off valve 5, and an injection water control valve 8) reduces a supply mount of water (diluting water) as the boiler (combustion facility) load increases.

Figure 5:
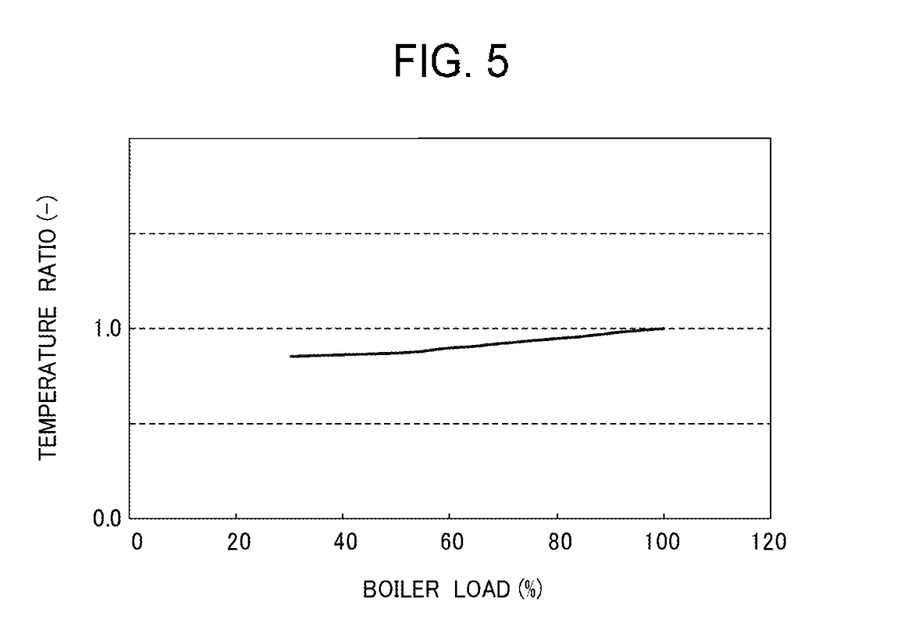
FIG. 5 shows a relationship between a boiler load and a temperature of exhaust gas.
Figure 6:
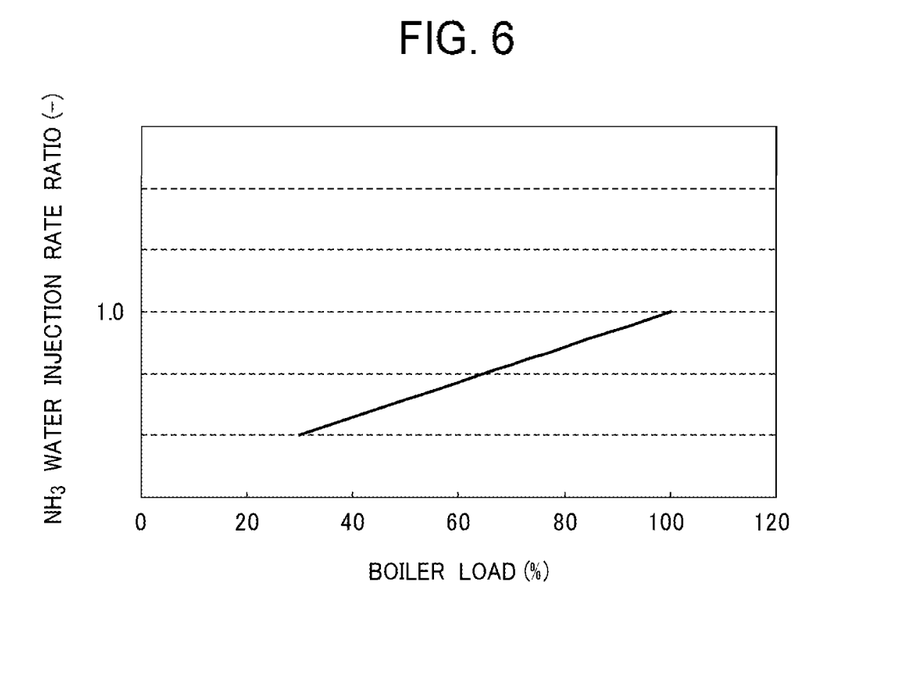
FIG. 6 shows a relationship between a boiler load and a flow rate (supply amount) of a reducing liquid (ammonia water)
Figure 12:
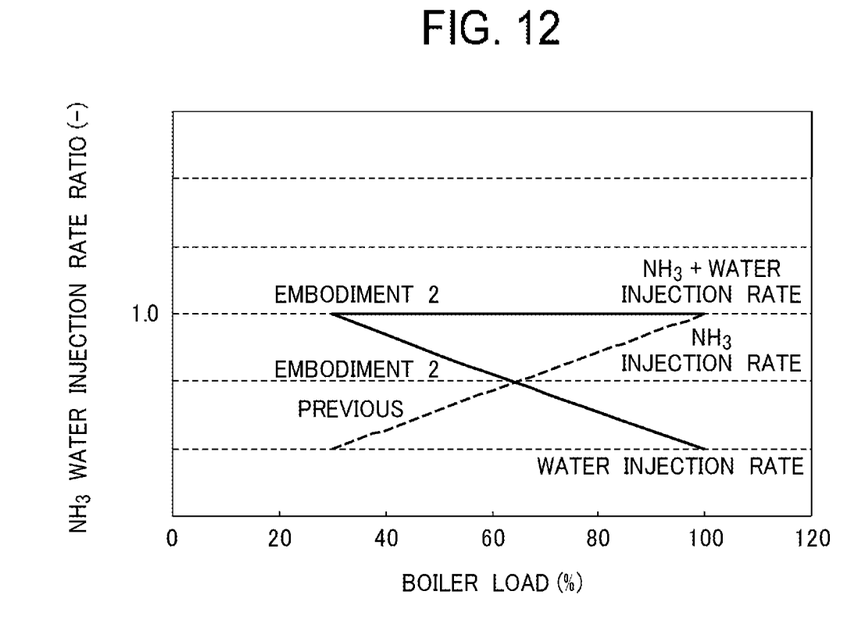
FIG. 12 shows relationships between a boiler load and flow rates (supply amounts) of a diluting liquid (diluting water) and a reducing liquid (ammonia water) in the embodiment 2.
Figure 13:
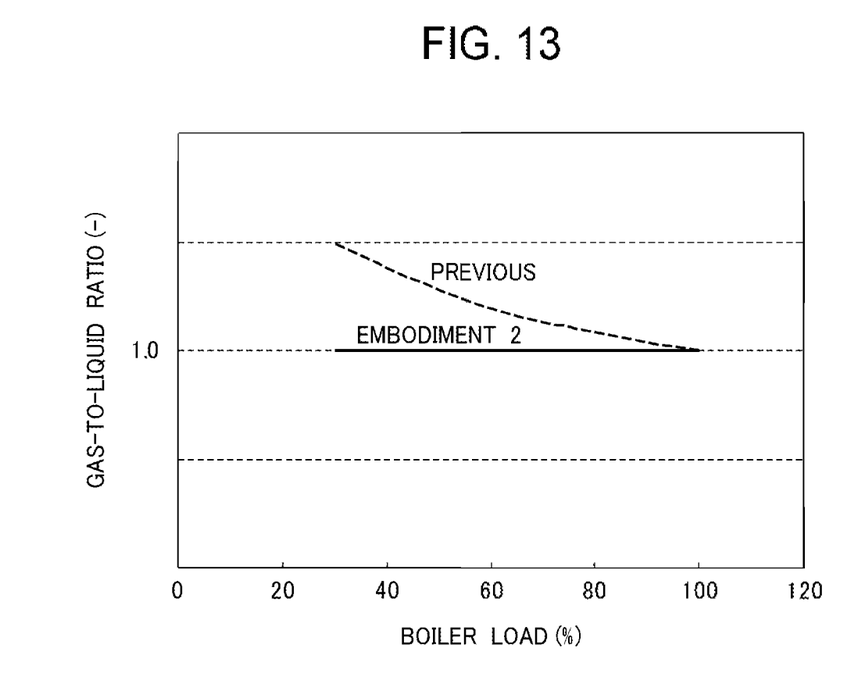
FIG. 13 shows a relationship between a boiler load and a gas-to-liquid ratio in the embodiment 2.
Figure 14:
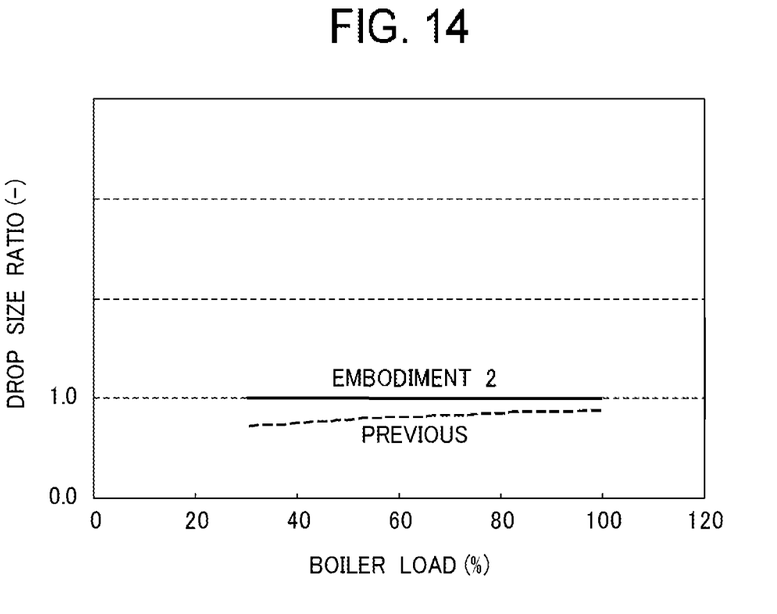
FIG. 14 shows a relationship between a boiler load and a drop size in the embodiment 2.

As shown in FIGS. 5 and 6, as the boiler load increases, temperature of exhaust gas rises to increase a flow rate (supply amount) of the reducing liquid (ammonia water) sprayed from the nozzle 2. In the present embodiment, as shown in FIG. 12, as the boiler (combustion facility) load increases, an injection rate (supply amount) of water (diluting water) is decreased to compensate an increasing flow rate of the ammonia water and a decreasing flow rate of the water (diluting water). As a result, an injection rate of a reducing liquid (ammonia water+water) sprayed form the nozzle 2 becomes substantially constant. The ammonia flowmeter 4 measures a flow rate of the ammonia water, and the injection water control valve 8 controls a flow rate of the water (diluting water) so that an increased flow rate of the ammonia water is compensated. As above, the concentration control unit (the injection water pipe 6, the injection water shut/off valve 5, and the injection water control valve 8) reduces a supply amount of the water (diluting water) so that a supply amount of the reducing liquid (ammonia water+water) becomes substantially constant regardless of a load of the combustion facility In the present embodiment, an amount of mist air supplied to the nozzle 2 from the air supply line 11 is set to be substantially constant, and an injection rate of the reducing liquid (ammonia water+water) sprayed from the nozzle 2 is substantially constant. Thus, as shown in FIG. 13, a gas-to-liquid ratio in the nozzle 2 of the present embodiment becomes substantially constant regardless of boiler load (combustion facility). Since the gas-to-liquid ratio becomes substantially constant regardless of the boiler (combustion facility) load, as shown in FIG. 14, a drop size of the present embodiment becomes substantially constant regardless of the boiler (combustion facility) load. As above, the concentration control unit (the injection water pipe 6, the injection water shut/off valve 5, and the injection water control valve 8) reduces a supply amount of the water (diluting water) so that a gas-to-liquid ratio of gas (mist air) and the reducing liquid (ammonia water+water) becomes substantially constant regardless of a load of the combustion facility.

Figure 15:
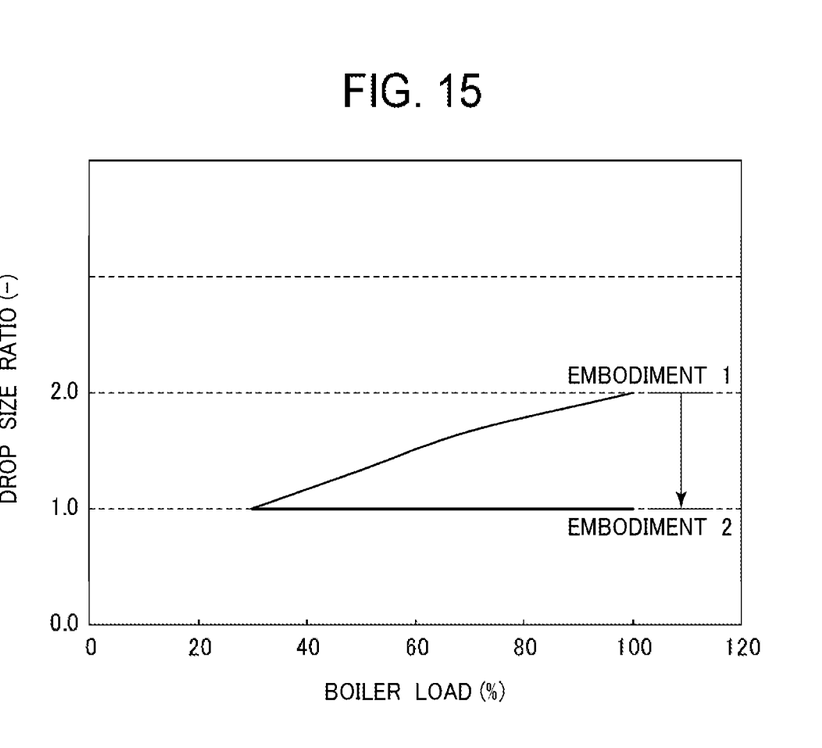
FIG. 15 shows respective relationships between a boiler load and a drop size in the embodiments 1 and 2.

As shown in FIG. 15, in the embodiment 1, as the boiler (combustion facility) load increases, a drop size increases, however, in the embodiment 2, a drop size is substantially constant regardless of the boiler (combustion facility) load. The drop size is maintained to be substantially constant, so that it is possible to allow evaporation time of the drop after injected from the nozzle 2 to be substantially constant. As shown in FIG. 15, if a drop size of the embodiment 2 in the boiler in operation at rated load (load 100%) is about half of a drop size of the embodiment 1, it is possible to reduce evaporation time by about 0.1 second. As a result, if an injection speed of the nozzle 2 is set at 15 m/sec., a mixing distance is reduced by 1.5 m (=0.1 sec.×15 m/sec.). In addition, the injection water control valve 8 reduces a supply amount of the water (diluting water) so that a supply amount of the reducing liquid (ammonia water+water) becomes substantially constant, thereby enabling an amount of usage of water (diluting water) to be reduced.

As described above, in accordance with the present invention, it is possible to prevent a reducing agent from vaporizing in the reducing liquid supply unit (the ammonia water supply line 10 and the lance 3) due to temperature of exhaust gas, whereby it is possible to perform steady atomizing and spraying by steadying an amount of the reducing liquid sprayed from the nozzle 2 to allow denitrification performance in denitrification apparatus to be maintained.

In addition, in a reducing agent injection unit of denitrification apparatus for a coal-fired and high-dust boiler, water (diluting water) is injected to prevent unnecessary evaporation of a reducing liquid occurring in a lance or a nozzle. The amount of the injected water (diluting water) is set so that the occurrence of situation can be prevented in which incomplete evaporation of the water (diluting water) in an exhaust gas duct after the spraying of water causes moisture adsorption on the dusts, resulting in blockage of the exhaust gas duct or a device provided downstream the exhaust gas duct.

The embodiments in accordance with the present invention are described above, however, the present invention is not limited to the embodiments, so that variations and modifications within a scope described in Claims are possible.

The present invention includes a denitrification apparatus used in a flue gas treatment equipment for a coal-fired and high-dust boiler, which apparatus includes an ammonia water injection nozzle for directly atomizing and spraying ammonia water serving as a reducing agent into exhaust gas and includes a system of injecting water to the ammonia water injection nozzle, which can achieve complete evaporation of the ammonia water in an exhaust gas duct after sprayed from the nozzle, prevents evaporation of the ammonia water in a lance and the nozzle, and supplies an amount of water equal to or less than two times the supply amount of aqueous solution of reducing agent in terms weight in operation at rated boiler load. The present invention also includes a denitrification apparatus which, in addition to having the above features, includes a flow control valve provided in the system of injecting water to control a gas-to-liquid ratio (a mist air amount/a liquid amount) to be constant with respect to change in boiler load.

The denitrification apparatus in accordance with the present invention is capable of reducing NOx from a combustion facility and preventing evaporation of a reducing liquid in a lance and an injection nozzle in the combustion facility in operation at a low load by adjusting concentration of a reducing agent. Accordingly, the denitrification apparatus is useful for achieving complete evaporation of the reducing liquid in an exhaust gas duct.

REFERENCE SIGNS LIST 1. exhaust gas duct
2. nozzle
3. lance
4. ammonia flowmeter
5. injection water shut/off valve
6. injection water pipe
7. exhaust gas thermometer
8. injection water control valve
9. ammonia water control valve
10. ammonia water supply line
11. air supply line
12. denitrification catalyst

What is claimed is:

1. A denitrification apparatus comprising:
   a nozzle for spraying a reducing liquid containing a reducing agent for reducing nitrogen oxides in exhaust gas discharged from a combustion facility into the exhaust gas by using a flow of gas;
   a gas supply unit for supplying the gas to the nozzle;
   a reducing liquid supply unit for supplying the reducing liquid to the nozzle; and
   a concentration control unit for adjusting concentration of the reducing agent on the basis of a temperature of the exhaust gas and a supply amount of the reducing liquid by supplying a diluting liquid to the reducing liquid so that the reducing agent is not vaporized in the reducing liquid supply unit.

2. A denitrification apparatus comprising:
   a nozzle for spraying a reducing liquid containing a reducing agent for reducing nitrogen oxides in exhaust gas discharged from a combustion facility into the exhaust gas by using a flow of gas;
   a gas supply unit for supplying the gas to the nozzle;
   a reducing liquid supply unit for supplying the reducing liquid to the nozzle; and
   a concentration control unit for adjusting concentration of the reducing agent on the basis of a temperature of the exhaust gas and a supply amount of the reducing liquid by supplying a diluting liquid to the reducing liquid so that the reducing agent is not vaporized in the reducing liquid supply unit,
   the concentration control unit adjusting a gas-to-liquid ratio of the gas and the reducing liquid on the basis of the temperature of the exhaust gas by supplying the diluting liquid to the reducing liquid so that a drop size of the reducing liquid sprayed from the nozzle becomes a predetermined size.

3. A denitrification apparatus comprising:
   a nozzle for spraying a reducing liquid containing a reducing agent for reducing nitrogen oxides in exhaust gas discharged from a combustion facility into the exhaust gas by using a flow of gas;
   a gas supply unit for supplying the gas to the nozzle;
   a reducing liquid supply unit for supplying the reducing liquid to the nozzle; and
   a concentration control unit for adjusting concentration of the reducing agent on the basis of a temperature of the exhaust gas and a supply amount of the reducing liquid by supplying a diluting liquid to the reducing liquid so that the reducing agent is not vaporized in the reducing liquid supply unit,
   the concentration control unit adjusting a gas-to-liquid ratio of the gas and the reducing liquid on the basis of the temperature of the exhaust gas by supplying the diluting liquid to the reducing liquid so that a drop size of the reducing liquid sprayed from the nozzle becomes a predetermined size, and
   the nozzle serving as a two-fluid nozzle.

4. The denitrification apparatus according to claim 1, wherein the concentration control unit adjusts a supply amount of the diluting liquid to be substantially constant regardless of a load of the combustion facility.

5. The denitrification apparatus according to claim 2, wherein the concentration control unit adjusts a supply amount of the diluting liquid to be substantially constant regardless of a load of the combustion facility.

6. The denitrification apparatus according to claim 3, wherein the concentration control unit adjusts a supply amount of the diluting liquid to be substantially constant regardless of a load of the combustion facility.

7. The denitrification apparatus according to claim 1, wherein the concentration control unit reduces a supply amount of the diluting liquid as a load of the combustion facility increases.

8. The denitrification apparatus according to claim 2, wherein the concentration control unit reduces a supply amount of the diluting liquid as a load of the combustion facility increases.

9. The denitrification apparatus according to claim 3, wherein the concentration control unit reduces a supply amount of the diluting liquid as a load of the combustion facility increases.

10. The denitrification apparatus according to claim 1, wherein the concentration control unit reduces a supply amount of the diluting liquid as a load of the combustion facility increases, and adjusts the supply amount of the diluting liquid so that a supply amount of the reducing liquid becomes substantially constant regardless of a load of the combustion facility.

11. The denitrification apparatus according to claim 2, wherein the concentration control unit reduces a supply amount of the diluting liquid as a load of the combustion facility increases, and adjusts the supply amount of the diluting liquid so that a supply amount of the reducing liquid becomes substantially constant regardless of a load of the combustion facility.

12. The denitrification apparatus according to claim 3, wherein the concentration control unit reduces a supply amount of the diluting liquid as a load of the combustion facility increases, and adjusts the supply amount of the diluting liquid so that a supply amount of the reducing liquid becomes substantially constant regardless of a load of the combustion facility.

13. The denitrification apparatus according to claim 1, wherein the concentration control unit reduces a supply amount of the diluting liquid as a load of the combustion facility increases, and adjusts the supply amount of the diluting liquid so that a gas-to-liquid ratio of the gas and the reducing liquid becomes substantially constant regardless of a load of the combustion facility.

14. The denitrification apparatus according to claim 2, wherein the concentration control unit reduces a supply amount of the diluting liquid as a load of the combustion facility increases, and adjusts the supply amount of the diluting liquid so that a gas-to-liquid ratio of the gas and the reducing liquid becomes substantially constant regardless of a load of the combustion facility.

15. The denitrification apparatus according to claim 3, wherein the concentration control unit reduces a supply amount of the diluting liquid as a load of the combustion facility increases, and adjusts the supply amount of the diluting liquid so that a gas-to-liquid ratio of the gas and the reducing liquid becomes substantially constant regardless of a load of the combustion facility.

\* \* \* \* \*

UNITED STATES PATENT AND TRADEMARK OFFICE
CERTIFICATE OF CORRECTION

| | | |
|---|---|---|
| PATENT NO. | : 9,664,383 B2 | Page 1 of 1 |
| APPLICATION NO. | : 14/289697 | |
| DATED | : May 30, 2017 | |
| INVENTOR(S) | : Hiroshi Yamakaji et al. | |

It is certified that error appears in the above-identified patent and that said Letters Patent is hereby corrected as shown below:

In the Applicant (71): Delete "BABCOCK-HITACHI KABUSHIKI KAISHA" and insert
-- MITSUBISHI HITACHI POWER SYSTEMS, LTD. --

In the Assignee (73): Delete "BABCOCK-HITACHI KABUSHIKI KAISHA" and insert
-- MITSUBISHI HITACHI POWER SYSTEMS, LTD. --

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*